United States Patent [19]
Burke et al.

[11] Patent Number: 5,821,633
[45] Date of Patent: Oct. 13, 1998

[54] CENTER OF WEIGHT SENSOR

[75] Inventors: Shawn E. Burke, Andover, Mass.; James E. Hubbard, Jr., Derry, N.H.

[73] Assignee: Trustees of Boston University, Boston, Mass.

[21] Appl. No.: 780,435

[22] Filed: Jan. 8, 1997

[51] Int. Cl.⁶ ................................................. B60R 21/32
[52] U.S. Cl. .................... 307/10.1; 180/273; 180/282; 280/735; 701/45
[58] Field of Search ...................... 307/10.1, 9.1, 307/121; 280/734, 735; 180/271, 282, 273; 340/436, 438, 669; 364/424.055–424.057; 701/45–47

[56] References Cited

U.S. PATENT DOCUMENTS

| | | |
|---|---|---|
| 4,565,940 | 1/1986 | Hubbard, Jr. . |
| 4,626,730 | 12/1986 | Hubbard, Jr. . |
| 4,935,614 | 6/1990 | Hubbard, Jr. et al. . |
| 5,026,977 | 6/1991 | Hubbard, Jr. . |
| 5,159,498 | 10/1992 | Hubbard, Jr. . |
| 5,232,243 | 8/1993 | Blackburn et al. ............ 180/273 |
| 5,327,397 | 7/1994 | Burke et al. . |
| 5,494,311 | 2/1996 | Blackburn et al. ............ 180/273 |
| 5,626,359 | 5/1997 | Steffens, Jr. et al. .......... 280/735 |
| 5,653,462 | 8/1997 | Breed et al. ................... 280/735 |

FOREIGN PATENT DOCUMENTS

| | | |
|---|---|---|
| 0222640 | 5/1987 | European Pat. Off. . |
| 3703630 | 8/1988 | Germany . |
| 3716168 | 11/1988 | Germany . |
| 4135784 | 5/1992 | Germany . |
| 2197121 | 5/1988 | United Kingdom . |
| 2252414 | 8/1992 | United Kingdom . |

OTHER PUBLICATIONS

Scott McMurray, "Driving Hard for Safety", *U.S. News & World Report*, Nov. 13, 1995, pp. 84 and 86.

*Primary Examiner*—Richard T. Elms
*Attorney, Agent, or Firm*—Weingarten, Schurgin, Gagnebin & Hayes LLP

[57] ABSTRACT

A sensor system preferably for use in a vehicle airbag deployment system employs spatial shading techniques and centroiding analysis to calculate an equivalent point load in two dimensional space. The location of the equivalent point load, as well as the weight of the passenger as determined from the sensors, are used to construct a set of fuzzy set logic boundaries defining different modes of deploying the airbag. The fuzz set logic boundaries may include a full deployment, soft deployment, no deployment and other intermediate deployment zones. In the event of a vehicle airbag incident, the airbag is deployed in accordance with the fuzzy set logic boundary in which the weight and equivalent point load of the vehicle occupant are located.

38 Claims, 13 Drawing Sheets

CENTER OF WEIGHT SENSOR

BACKGROUND OF THE INVENTION

This invention relates to the field of sensors, and particularly to a sensor architecture preferably utilized in a vehicle airbag control system which determines the weight and two dimensional spatial location of an equivalent point load as representing the passenger. The location and weight of the passenger are used to construct airbag firing zones which determine whether and how the airbag will deploy.

Frontal airbags are now a standard feature in most modern automobiles. The recent trend in modern airbag design is moving towards sophisticated systems that implement energy management, i.e., the application of less than 100% of the airbag's potential cushioning force upon deployment of the airbag. It has been desirable for some time to manage the speed of the airbag's deployment based on factors such vehicle speed, intensity of the collision, and passenger weight. Until now, such objectives have not been achieved.

It has been for some time the goal of design engineers to manage the energy of the deploying airbag so that they deploy at variable rates ranging anywhere from less than 50% of the potential cushioning effect of the airbag to 100% of the cushioning effect of the airbag. These considerations are important inasmuch as the characteristics of the driver or passenger may range in weight from a small infant to a large adult.

Today's airbags deploy at only one rate: 100% force. Typically, airbags are deployed at speeds approaching 200 m.p.h. An object or passenger struck by an airbag inflating at such speeds absorbs forces approaching 2500 lbf. In order to be deployed at anything less than 100% force, there is a need for more intelligent, highly integrated, low-cost, high performance electronic sensor technologies.

Under ideal firing conditions, the airbag should fully deploy or be nearly fully deployed before the passenger's body moves forward as a result of the accident so that the force of deployment is not absorbed by the occupant. In practice, however, the airbag often strikes the vehicle occupant before being fully deployed. This is due to the fact that each passenger in a vehicle, whether the driver or otherwise, assumes a unique ergonomic position and are of different sizes and weights. Vehicle occupants who are tall usually adjust their seats rearwardly and may even recline their seats. This creates an ideal body position for purposes of complete airbag deployment inasmuch as the passenger will likely not be struck by the airbag while it is deploying.

In the case of shorter passengers, on the other hand, the seats are often adjusted forward, placing the passenger in the firing zone of the airbag. Likewise, when the passenger is an infant of small child in a rear facing child seat, the deployment of the airbag often causes a violent collision and subsequent rearward force applied to the backside of the seat.

Furthermore, the weight of the occupant is an important factor in the ability of a child or small adult to sustain the trauma delivered by airbag deployment. Children and small adults are particularly susceptible to injury not only due to being situated in the zone of the deployment, but also as a virtue of their size they are unable to sustain the large impact force delivered by the airbag.

In order to evaluate whether an individual is situated in the firing zone of an airbag, or whether, given the weight of the individual, the deployment of the airbag would cause more injury than non-deployment, "smart" sensors are needed. However, to date, no such sensors are commercially available which are capable of providing both a means of continuously determining whether a vehicle occupant is positioned in the airbag deployment zone and the weight of the occupant.

These and other problems are sought to be overcome by the invention of the preferred embodiments.

SUMMARY OF THE INVENTION

It is an object of the present invention to provide a sensor system capable of taking a distributed load and reducing it to an equivalent point load in two spatial dimensions.

It is a further object of the present invention to provide a sensor system capable of determining the weight of the distributed load.

It is a further object of the present invention to provide a sensor system capable of continuously updating the position of the equivalent point load under both static and dynamic operating conditions.

It is a further object of the present invention to provide a sensor system for use in a vehicle airbag system to determine whether a vehicle occupant as represented by an equivalent point load is in the firing zone of the airbag and, if so, to selectively control the deployment of the airbag or deactivate the airbag altogether depending upon the position of the vehicle occupant.

It is still further yet an object of the present invention to provide a sensor system for use in a vehicle airbag system to determine whether a vehicle occupant weighs less than a predetermined value and, if so, to selectively control the deployment of the airbag or deactivate the airbag altogether depending upon the weight and location of the vehicle occupant.

These and other objects of the present invention are accomplished by a sensor system comprising a plurality of discrete and/or distributed sensing elements each having a predetermined area and located in a two-dimensional area subject to distributed loads. Each sensing element provides an output signal proportional to the integral of the applied stress over the two dimensional area of the sensing element. The center of force of a distributed load in the two dimensional area is calculated by summing the weighted or shaded output signals from the sensing elements extending respectively to the X and Z boundaries of the two-dimensional area to obtain two numerators and dividing the numerators by a denominator which is obtained by summing uniformly weighted or shaded output signals from the discrete sensing elements.

At least three sensors are needed in order to gather the center of force and weight information of the distributed load in a given sensing aperture. The sensor system preferably controls an automotive airbag system. The sensor system is preferably disposed in the seat of the automobile. The point load and its location represented by the center of force and weight information is used to construct fuzzy set logic boundaries. The fuzzy set logic boundaries control whether and how the airbag will be deployed. At least two, but preferably three fuzzy set logic boundaries, and possibly more, are established, including "FULL DEPLOY", "SOFT DEPLOY" and "NO DEPLOY" boundaries or zones. The "FULL DEPLOY" zone would typically be occupied by a grown adult or large child sitting against the seat back and out of the firing zone of the airbag. However, even the grown adult could enter the "SOFT DEPLOY" or even the "NO DEPLOY" zones if the passenger adjusted his or her position so that their equivalents point load moved in the direction of the dashboard and hence into the airbag firing zone.

The "SOFT DEPLOY" zone is typically occupied by a small adult or child when sitting against the seat back. However, if the small adult or child adjusted his or her position so that their equivalent point load moved in the direction of the dashboard, the passenger could enter the "NO DEPLOY" zone. Finally, the "NO DEPLOY" zone is typically occupied by a small child or a baby sitting in a car seat, or by an empty or unoccupied car seat. The equivalent point load and weight of a small child or baby seated in a car seat is such that the "FULL DEPLOY" and "SOFT DEPLOY" fuzzy set logic boundaries collapse, leaving the small child or baby in the "NO DEPLOY" zone.

These and other objects, features and advantages of the present invention will become readily apparent to one of ordinary skill in the art when reading the Detailed Description of the Preferred Embodiments in conjunction with the drawings.

DETAILED DESCRIPTION OF THE PREFERRED EMBODIMENTS

Figure 1:
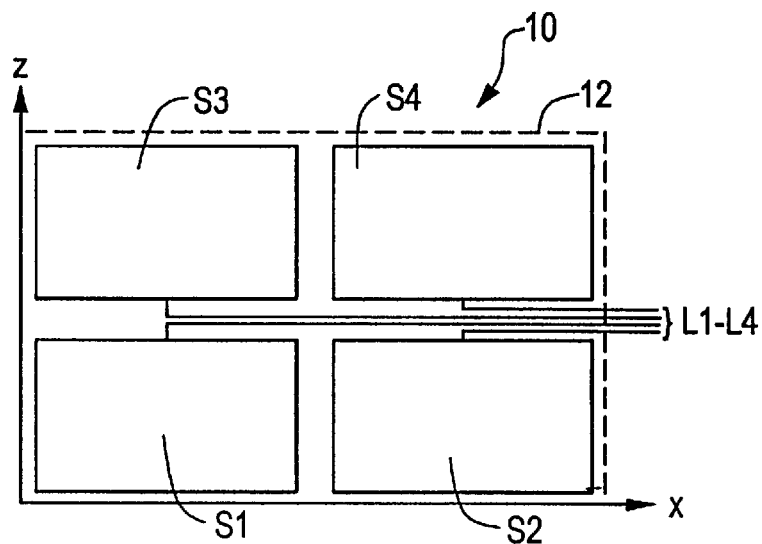
FIG. 1 depicts a sensor architecture for the sensor system according to a first preferred embodiment.
Figure 1A:
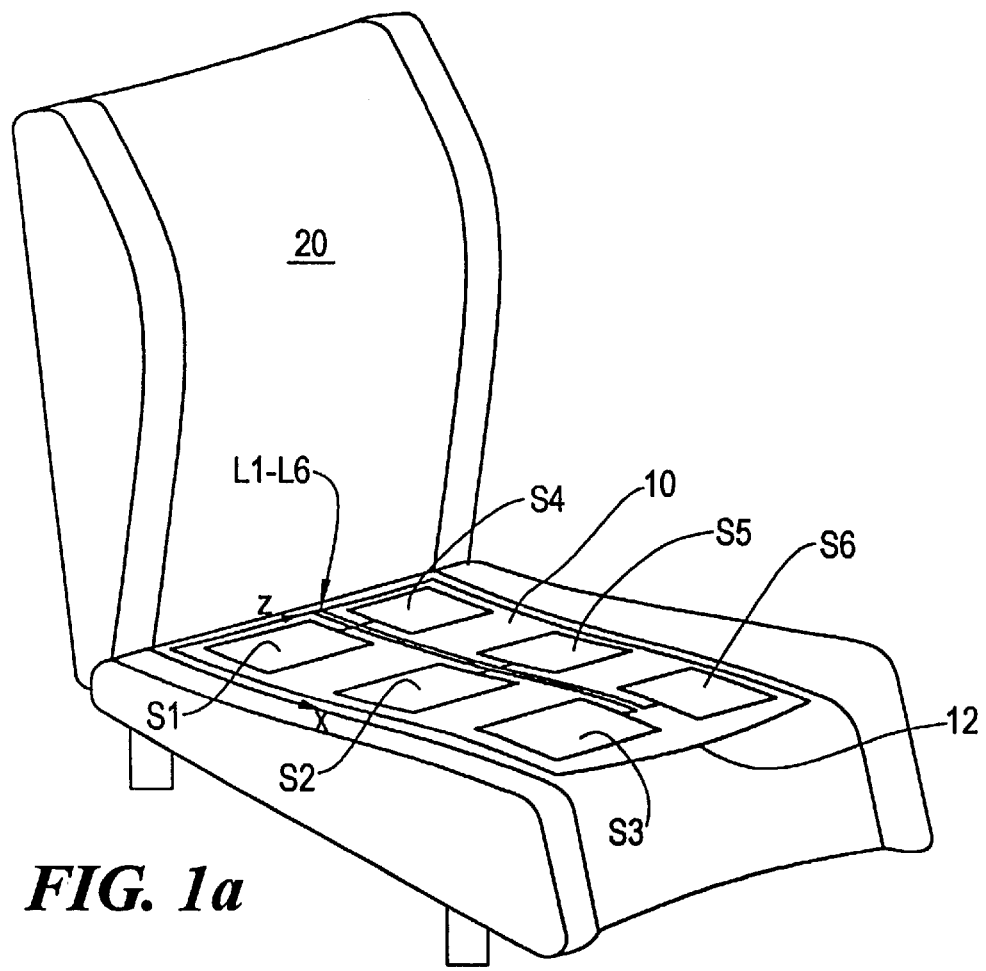
FIG. 1a depicts a sensor architecture according to one preferred embodiment as applied to the seat of an automobile.

With reference to FIGS. 1 and 1a, there is shown a sensor system 10 for use in a vehicle airbag supplemental restraint system. Sensor system 10 is preferably embedded in the seat or seats 20 of an automobile which have an airbag associated therewith. Sensor system 10 is defined by a sensing aperture 12 surrounding each of the sensors. Sensing aperture 12 is defined by dot-dash line and the x-z plane. Sensing aperture 12 is sized and positioned to receive substantially all of the vertical forces typically delivered to the seat of the car when a passenger is seated in the vehicle. Sensor system 10 according to the embodiment of FIG. 1 comprises four sensors S1, S2, S3, S4 arranged in an x-z plane. System 10 according to the embodiment of FIG. 1a comprises six sensors S1–S6 arranged in the x-z plane.

Sensors S1–S4 of FIG. 1 and sensors S1–S6 of FIG. 1a are preferably piezoresistive sensors. Piezoresistive sensors, as the name implies, are materials that exhibit a change in resistance when subjected to a pressure. Alternatively, sensors S1–S4 and S1–S6 could be piezoelectric (with an AC bridge), ceramic, piezopolymer, load cells, magnetostrictors or any other available sensors.

Sensors S1–S4 and S1–S6 each have associated leads L1–L4 and L1–L6, respectively, which connect with appropriate signal processing electronics. An output signal, preferably in the form of an output voltage, develops as a result of a force applied to sensors S1–S4 and S1–S6 and is transferred across leads L1–L4 and L1–L6 to suitable processing devices discussed in more detail below. Sensors S1–S4 and S1–S6 are arranged along an x-z coordinate system so that, using centroiding analysis, the center of weight of the distributed load, and more particularly, the center of weight of an occupant, may be idealized to a concentrated point in the x-z plane. Once the location of the center of force is known, appropriate controls are implemented to determine whether and how an airbag of an automobile is deployed.

More particularly, the equivalent point load of the distributed weight of an individual is determined via a centroid calculation. Center of force means the centroid of a force acting over a surface along a specified aperture. As such, the center of force $C_f$ is analogous to the centroid of a mass distribution, which is determined as follows, $$C_f(t) = \frac{\int_a^b x f(x,t)dx}{\int_a^b f(x,t)dx}, \tag{1}$$

where,

[a, b] defines the limits of the aperture along the x axis, x is the shading function of the sensor, and f(x,t) is the exogenous force distribution. Equation (1) defines a weighting of the force in x normalized by the load's integral over the aperture.

When a force distribution on a surface varies over the two coordinates x and z, Equation (1) may be generalized for calculating the center of force and any higher spatial moments of the load distribution as, $$C_{f,x}(t) = \frac{\int_a^b \int_c^d x^n f(x,z,t)dxdz}{\int_a^b \int_c^d f(x,z,t)dxdz} \quad (2)$$

where,

[a, b] defines the limits of the aperture along the x axis, [e, d] defines the limits of the aperture along the z-axis, $x^n$ is the shading function of the sensor which, when n>1 are the higher spatial moments of the load distribution, and f(x,z,t) is the exogenous force distribution. Equation (2) defines a weighting of the force in the x-direction normalized by the load's integral over the aperture. When n=1, Equation (2) defines the center of force in the x-direction.

Similarly, along the z-axis, the center of force and any higher spatial moments of the force distribution may be expressed as, $$C_{f,z}(t) = \frac{\int_a^b \int_c^d z^n f(x,z,t)dxdz}{\int_a^b \int_c^d f(x,z,t)dxdz} \quad (3)$$

where,

[a, b] defines the limits of the aperture along the x axis, [c, d] defines the limits of the aperture along the z-axis, $z^n$ is the shading function of the sensor which, when n>1 are the higher spatial moments of the load distribution and f(x, z, t) is the exogenous force distribution. Equation (3) defines a weighting of the force in the z-direction normalized by the load's integral over the aperture. When n=1, Equation (3) defines the center of force in the z-direction.

Equations (2) and (3) may be modified to gather information indicative of higher moments simply by changing the value of n. If for instance, n=2, equations (2) and (3) define the average spatial extent of the individual. Such information provides generalized approximations of the passenger's physique, i.e., whether the passenger is slim, portly or somewhere in between. Other, higher moments, such as where n=3, provide information about the uniformity of the load distribution over the aperture, e.g., whether the distributed load is concentrated around a few locations, or uniformly spread over the aperture.

Using Equations (1)–(3), the center of force distribution along a surface may be determined most generally by first measuring two component integrals over the apertures [a, b], [c, d], and then dividing each respective component integral over the total area under consideration. The numerator in each of Equations (2) and (3) represents a shaded aperture, i.e., spatial gain-weighting across the aperture. The denominator in each of Equations (2) and (3) represents an unshaded aperture, i.e., the total force realized over the entire aperture. Both apertures are coincident (i.e., have the same boundaries).

Unfortunately, a set of coincident distributed apertures, one of which is shaded linearly and the other of which is unshaded, cannot at the time of this application be practically manufactured. Otherwise, the center of force component integrals of Equations (2) and (3) could be realized exactly. Thus, methods of approximating Equations (2) and (3) must be constructed, while still permitting the center of force to be measured for several practical applications using readily available materials and technologies. This method is realized through aperture shading approximations. A discussion of shaded apertures is found in U.S. Pat. No. 5,327,397 granted to the inventors herein and hereby incorporated by reference.

Figure 2:
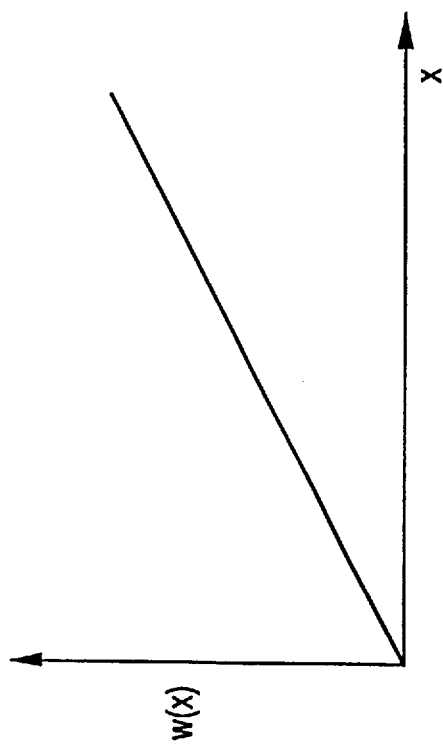
FIG. 2 depicts the linear shading function of a sensing aperture along the x-axis.

Aperture shading is the spatial gain-weighting of a sensor aperture. Aperture shading is used to develop the component integrals used to compute the center of force along an aperture. The aperture shading in Equation (2) is a linear weighting along the x-axis, and is depicted conceptually in FIG. 2. If this weighting is to be realized in a distributed sensor, for instance, one that produces a voltage proportional to the integral of an applied normal stress, then the sensitivity, or gain, of this sensor would vary linearly in x, and be constant along z. No such practical device or sensing medium currently exists so, in order to make the center of force calculation, an approximation of the shading using available materials must be constructed.

Figure 3:
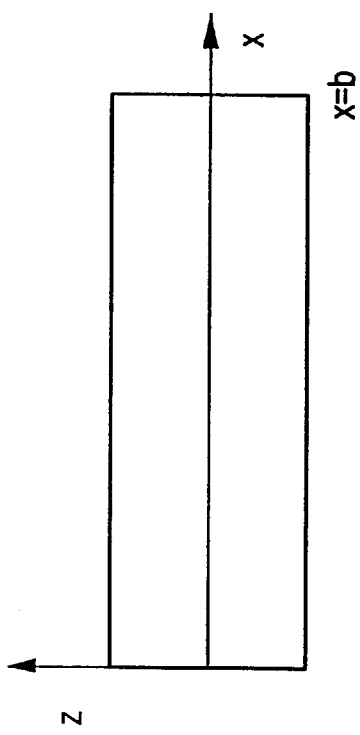
FIG. 3 depicts a shaded sensor aperture which approximates a perfect linearly-shaded aperture, the output of which is the numerator integral which, when combined with the uniform sensor aperture of FIG. 4, yields the center of weight.

With reference to FIG. 3, a shaped sensor aperture is depicted. The sensor is constructed of a material that provides an electrical output or change in electrical characteristics proportional to an applied normal stress, such as a piezoelectric material, force sensing resistors, load cells, etc. These applied materials integrate the applied stress over their areas. If the sensing aperture of FIG. 3 were acted upon by a spanwise-homogeneous force distribution, i.e., a force applied along the x axis but uniform in the z direction, then the output would be proportional to a linear weighting in the x-direction of the integration of this force over the shaped aperture. The force would induce little or no component output near the end x=0, would contribute maximally to the sensor's output in the vicinity of x=b, and would contribute other differential components in proportion to the aperture's width at all intermediate locations. Since the aperture's width varies linearly, this weights the integration of the force over the aperture [0, b] linearly. Thus, the shaped aperture depicted in FIG. 3 is an approximation to the hypothetical "ideal" linearly-shaded aperture described above. In other words, the output of this aperture approximates the numerator integral in Equation (2) for force distributions that can be assumed to be spanwise-homogeneous, for n=1.

Figure 4:
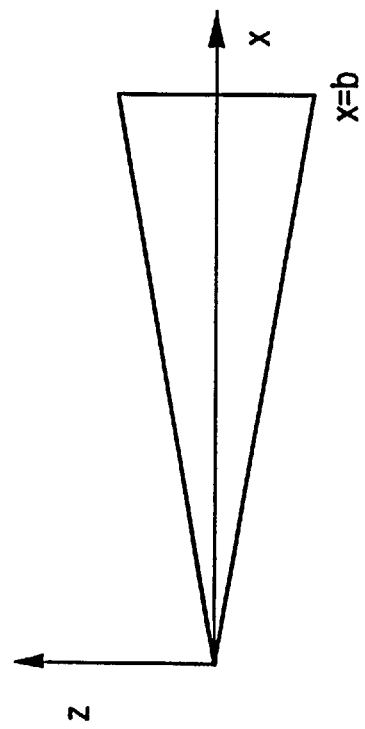
FIG. 4 depicts a uniform rectangular sensor aperture, the output of which is the denominator integral which, when combined with the shaded sensor aperture of FIG. 3, yields the center of weight.

The denominator in Equation (2) can be realized in practice by a simple rectangular sensing aperture. This aperture is shown in FIG. 4. The output of the aperture of FIG. 4 is the denominator integral of Equation (2) for any force distribution (i.e., not just spanwise homogeneous).

If the apertures of FIGS. 3 and 4 are manufactured so that they are coincident, then, the ratios of their outputs would satisfy Equation (2), yielding a direct measurement of the center of force in the x-direction over the aperture. These apertures may be made coincident in two ways. First, the shaped aperture of FIG. 3 could be laminated on top of the rectangular aperture of FIG. 4. However, a more practical way flows from the realization that since the distributed sensors (such as in FIG. 3) provide outputs that integrate applied stresses over their apertures, the principle of superposition may be used to develop composite apertures such as is shown in FIG. 5.

Figure 5:
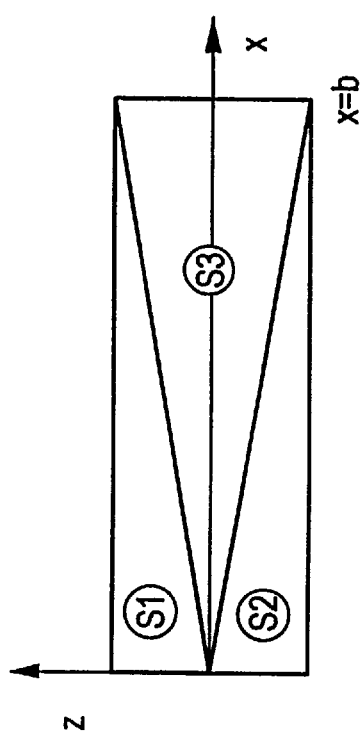
FIG. 5 depicts the composite sensor aperture of FIGS. 3 and 4.

With particular reference to FIG. 5, subaperture S3 is the linearly shaped aperture shown in FIG. 3, so its output provides the numerator integral for Equation (2). The summed outputs of subapertures S1–S3 provide an output equivalent to the output of the uniform aperture shown in FIG. 4. This summed output provides the denominator integral for Equation (2). Consequently, the composite shaped apertures shown in FIG. 5 provides two coincident apertures S3 and S1–S3, respectively, with the shading required to form the center of force integral (2). This may alternatively be achieved by electrode shaping on top of a single distributed sensor's aperture.

Spatially-shaded apertures can also be approximated piecewise, using a collection of adjacent sub-apertures whose outputs are scaled and combined electrically and/or digitally.

Figure 6:
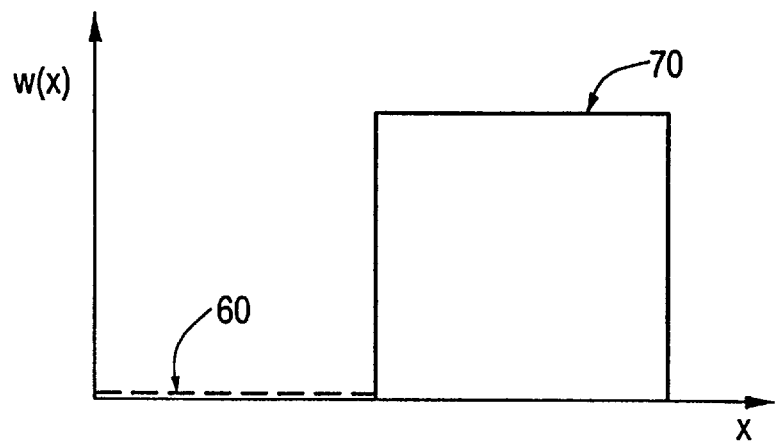
FIGS. 6 and 6a depict a functional approximation of a linear shading with uniform elements.
Figure 6A:
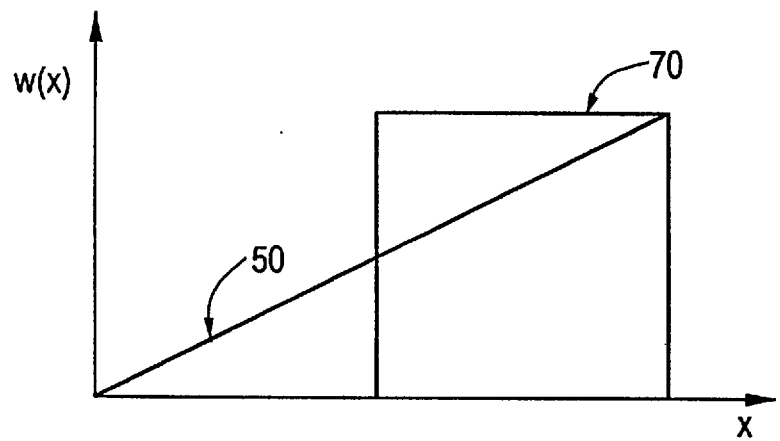

The least complex means for a piecewise approximation of the requisite apertures for realizing the integrals in Equations (2) and (3) involves the use of two subapertures. With reference to FIGS. 6 and 6a, the linear shading 50 and its 2-element piecewise approximation is plotted. The first element of the 2-element piecewise approximation 60 has a gain $k_1$ of zero, while the second 70 has a maximum gain, i.e., a gain of unity or 1. A composite sensor aperture that embodies both a linearly shaded sensor aperture and a uniform sensor aperture is shown in plan view in FIG. 7.

Figure 7:
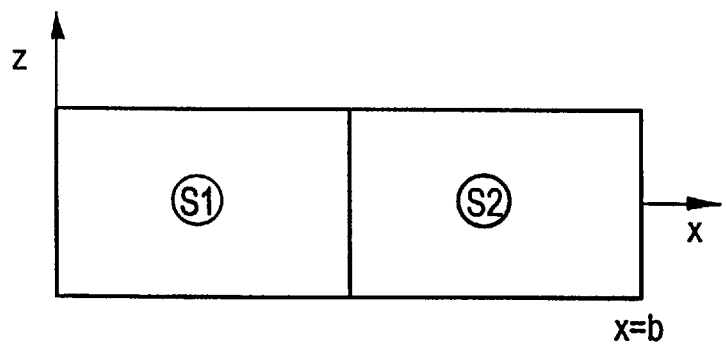
FIG. 7 depicts a two-element coincident sensor aperture for obtaining a $C_f$ measurement along one axis.

If the outputs of subapertures 1 and 2 (as depicted in FIG. 7) are combined, $C_{f,x}$ may be approximated as, $$C_{f,x} = \frac{S_2}{S_1 + S_2} \qquad (4)$$

This approximation may be used to spatially localize the equivalent point load of a distributed load. Equation (4) assumes that the subapertures are separated at x=b/2, and $0 \leq C_{f,x} \leq 1$.

A similar composite aperture can be employed to measure the signals required to compute both $C_{f,x}$ and $C_{f,z}$. For instance, with reference to the composite aperture depicted in FIG. 8, in a manner analogous to Equation (4), signals $S_1$ to $S_4$ may be combined to yield, $$C_{f,x} \cong \frac{S_2 + S_4}{S_1 + S_2 + S_3 + S_4} = \frac{\int_0^{\frac{d}{2}} \int_{\frac{b}{2}}^{b} f dx dz + \int_{\frac{d}{2}}^{d} \int_{\frac{b}{2}}^{b} f dx dz}{\int_0^{\frac{d}{2}} \int_0^{\frac{b}{2}} f dx dz + \int_0^{\frac{d}{2}} \int_{\frac{b}{2}}^{b} f dx dz + \int_{\frac{d}{2}}^{d} \int_0^{\frac{b}{2}} f dx dz + \int_{\frac{d}{2}}^{d} \int_{\frac{b}{2}}^{b} f dx dz} \qquad (5)$$

where,
f=f(x, z, t), i.e., real time measurements of the center of force in the x and z directions.

$$C_{f,z} \cong \frac{S_3 + S_4}{S_1 + S_2 + S_3 + S_4} = \frac{\int_{\frac{d}{2}}^{d} \int_0^{\frac{b}{2}} f dx dz + \int_{\frac{d}{2}}^{d} \int_{\frac{b}{2}}^{b} f dx dz}{\int_0^{\frac{d}{2}} \int_0^{\frac{b}{2}} f dx dz + \int_0^{\frac{d}{2}} \int_{\frac{b}{2}}^{b} f dx dz + \int_{\frac{d}{2}}^{d} \int_0^{\frac{b}{2}} f dx dz + \int_{\frac{d}{2}}^{d} \int_{\frac{b}{2}}^{b} f dx dz} \qquad (6)$$

where,
f=f(x, z, t).

Figure 8:
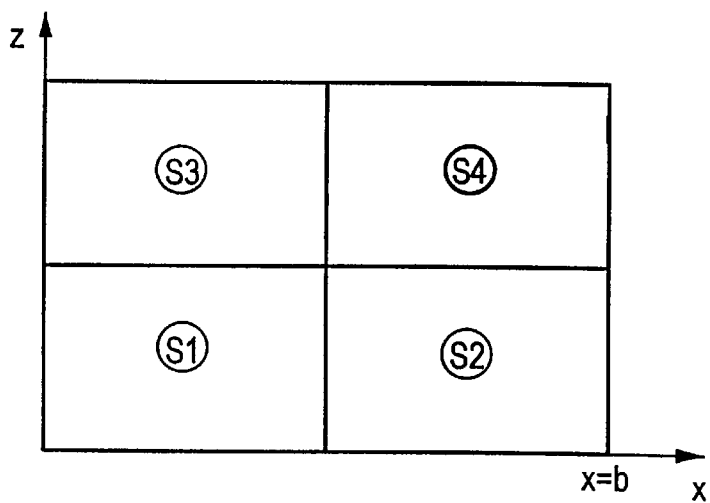
FIG. 8 depicts a four-element sensor aperture for obtaining $C_{f,x}$ and $C_{f,z}$ measurements.

Equations (5) and (6) are used to calculate the normalized location of the equivalent point load of a distributed load according to the sensor architecture of FIG. 8. It will be appreciated that the sensor architecture of FIGS. 1 and 8 are similar, with the exception of the separation between the sensors in FIG. 1. There is no requirement that the sensors touch one another. Rather, they only need to be located with the boundaries of the aperture 12 under consideration.

Further, a large number of sensor architecture's besides those of FIGS. 1 and 8 are available. The basic spatial moment equations remain the same, but the calculations are modified to suit the different sensor arrangements. As the number of sensors increases, the calculations become complex, but once the basic theory behind the calculations, as spelled out above, is known, a designer can chose from one of many architectures to arrive at a piecewise spatial approximation of a continuous function. The only requirement as far as quantity of sensors is concerned is that at least three sensors are needed.

Figure 9:
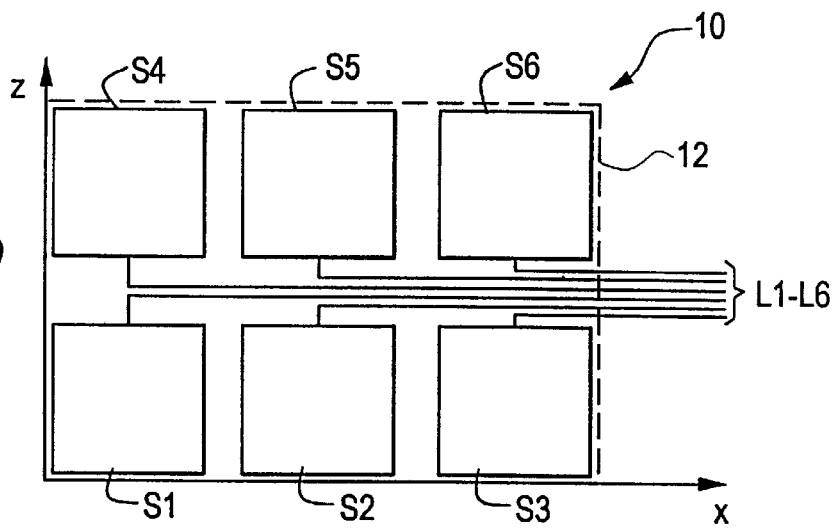
FIGS. 9–16 depict various sensor architectures for the sensor system according to further preferred embodiments of the invention.

For instance, with reference to FIG. 9, a sensor architecture according to another preferred embodiment is depicted. Sensor system 10 includes six discrete sensors, S1–S6 arranged in the x-z plane. Each sensor S1–S6 has a corresponding lead L1–L6 extending to suitable electronics to perform the various centroiding calculations and weight summations necessary to arrive at the location and weight of a distributed load. Under the architecture of FIG. 9, the center of force $C_{f,x}$ and $C_{f,z}$ are obtained as follows:

$$C_{f,x} = \frac{\frac{1}{2} S2 + S3 + \frac{1}{2} S5 + S6}{S1 + S2 + S3 + S4 + S5 + S6} \qquad (7)$$

$$C_{f,z} = \frac{S4 + S5 + S6}{S1 + S2 + S3 + S4 + S5 + S6} \qquad (8)$$

where S1–S6 represent the signals from sensors appropriately gain weighted over the aperture of the sensor. Like Equations (5) and (6), signals S1–S6 can be substituted by appropriate integrals representative of the area of the aperture multiplied by the appropriate gain weighting to arrive at the center of force in the x and z directions.

Figure 10:
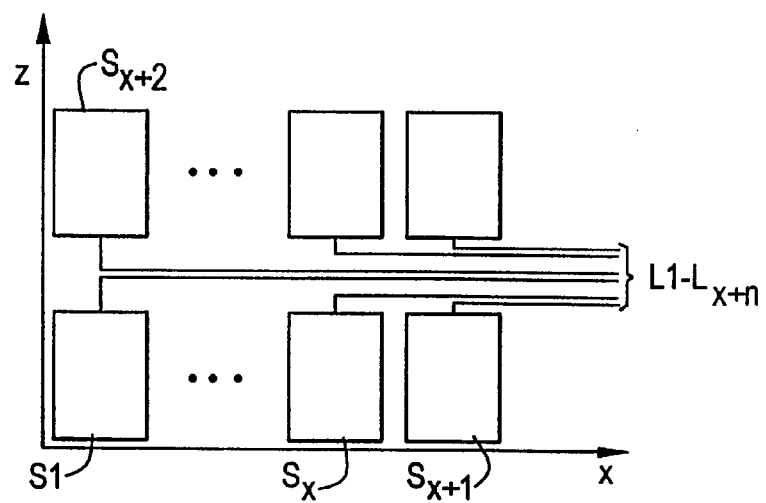
Figure 12:
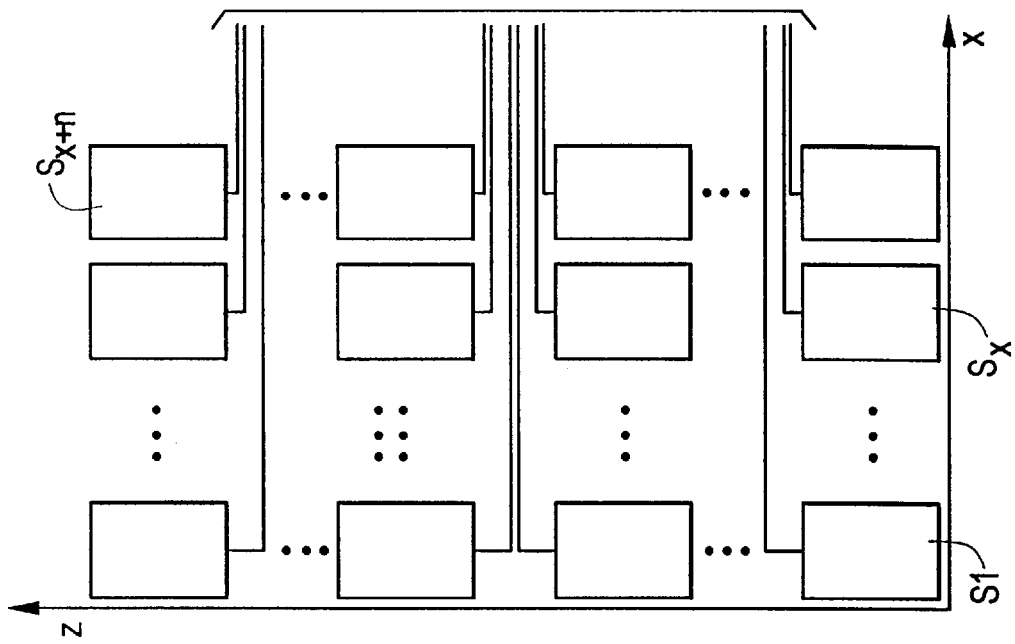
Figure 11:
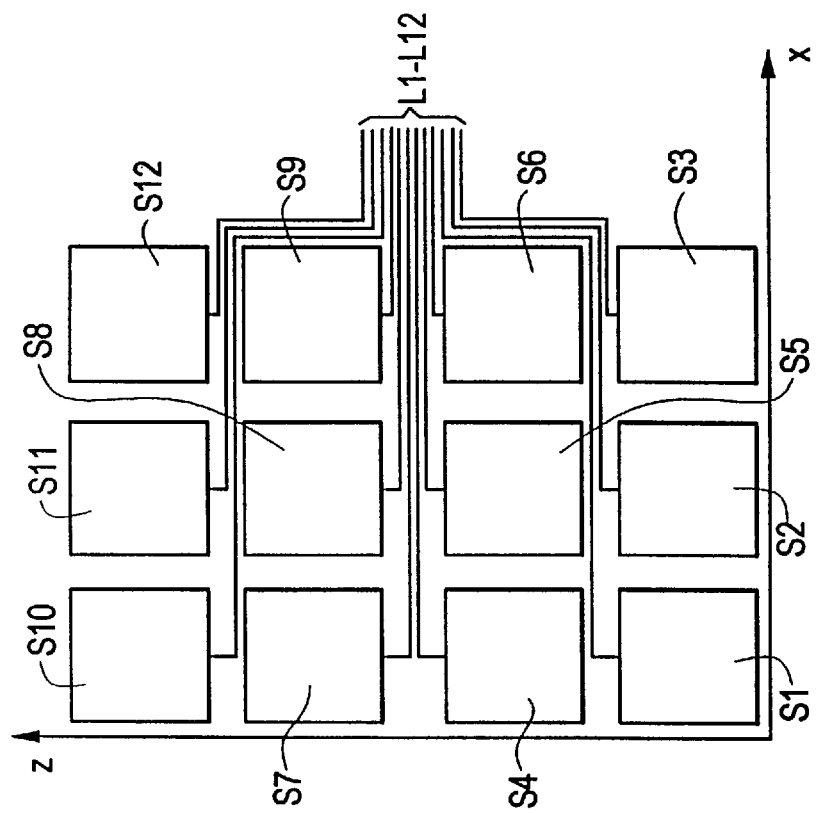
Figure 13:
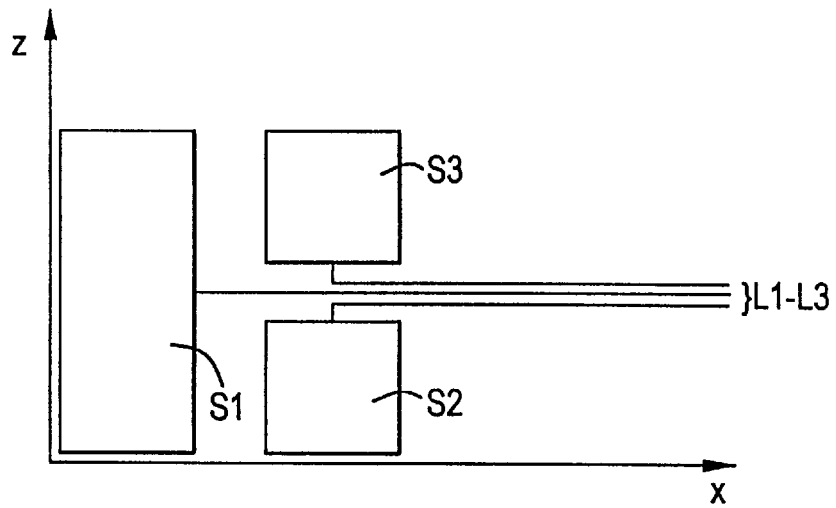
Figure 14:
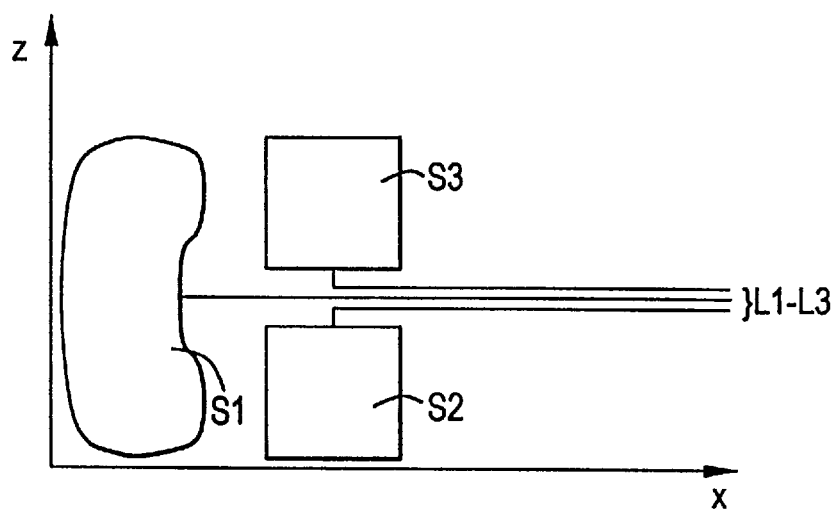
Figure 15:
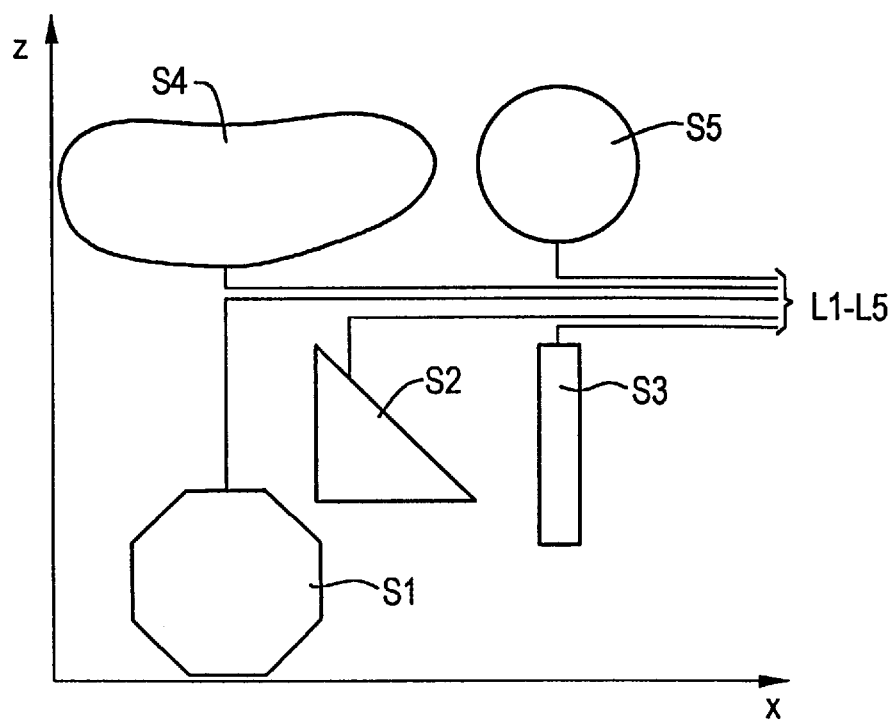
Figure 16:
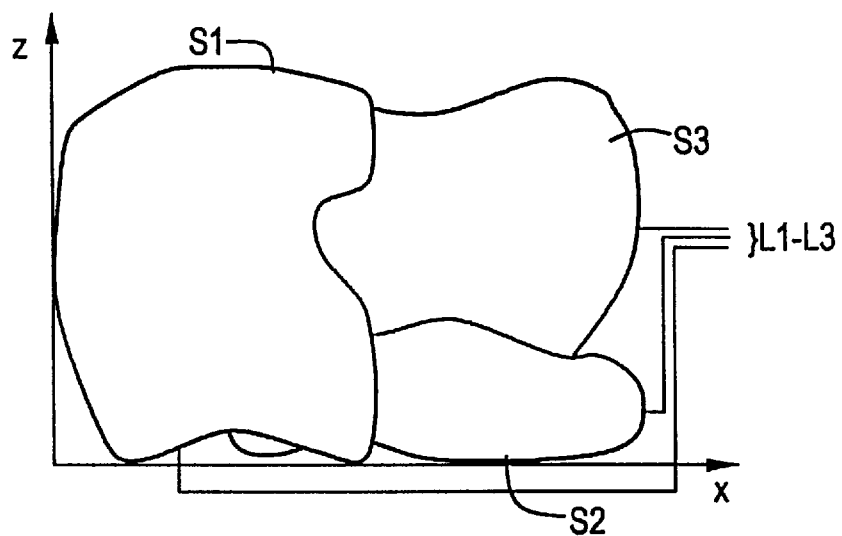

FIGS. 10–16 represent various other sensor arrays according to the preferred embodiments. For instance, the sensor array of FIG. 10 is a 2×N sensor array when N is the number of sensors extending along the x axis. Similarly, the number of sensors might extend in both the x and z directions, depending on the design specifications. As seen in FIGS. 13–14, the sensor array must have at least three sensors S1–S3 in order to resolve the center of force and weight. However, the sensor may assume various, non-conventional configurations, such as the sensors in FIGS. 14–15. As seen in FIG. 16, the sensors may even overlap one another while still providing the necessary information to allow the center of force and other spatial moments to be determined using the foregoing, equations. The only requirement is that none of the sensors be identical in size, shape and location.

Figure 17:
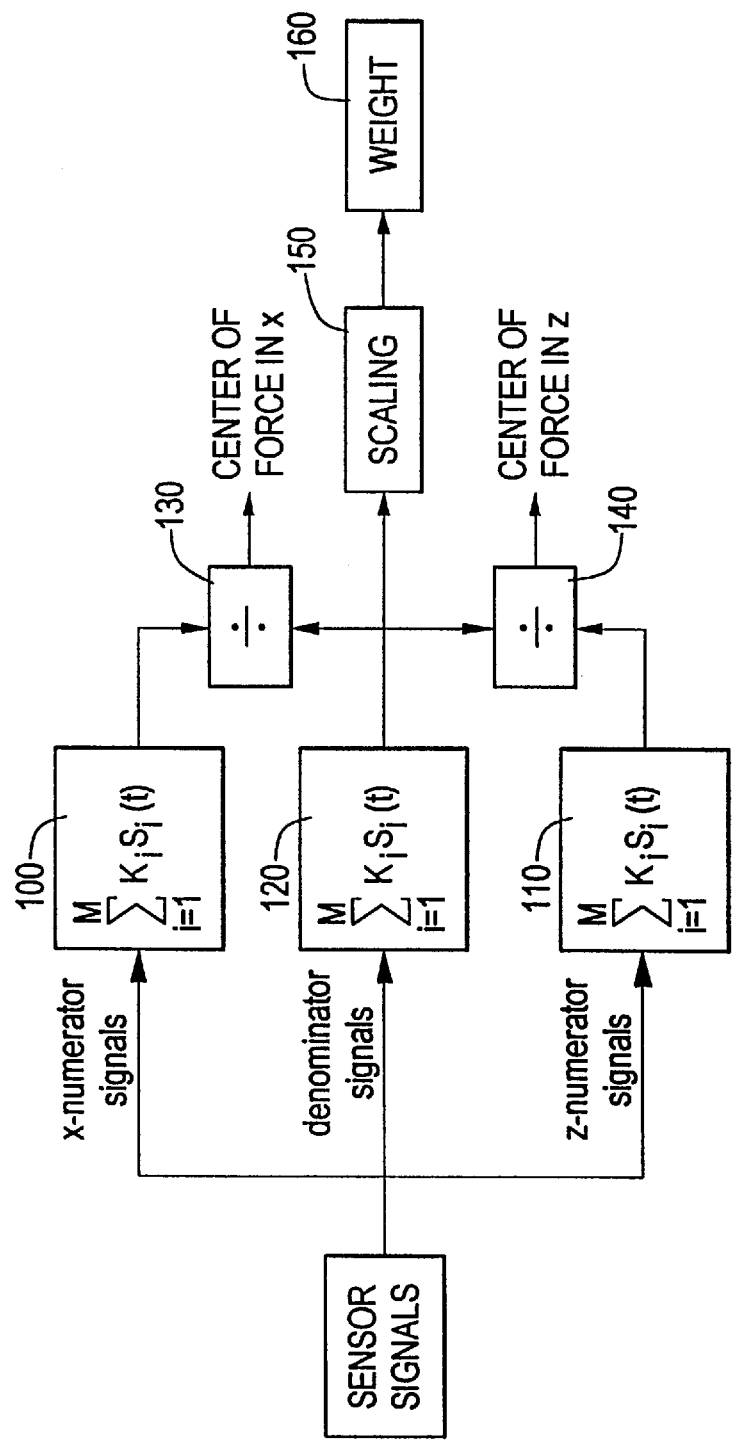
FIG. 17 is a block diagram showing the method of calculating the equivalent point load of a distributed load as well as the weight of the load according to the preceding sensor architectures of the preferred embodiments.

With particular reference to FIG. 17, the method of calculating the center of force and load for all of the preceding sensor architectures is depicted. For any given sensor architecture, including those of FIGS. 10–16, the calculation of the center of force and load remains the same. In block 100, the x-numerator signals are obtained. The x-numerator signals are a summation of the sensor signals $s_i$ multiplied by the appropriate gain weighting factor $k_i$ along the x-axis. In block 110, the z-numerator signals are obtained. The z-numerator signals are the summation of the sensor signals $s_i$ multiplied by the appropriate gain weighting factor $k_i$ along the z-axis. In block 120, the denominator signals are obtained. The denominator signals are a summation of all of the sensor signals $s_i$ multiplied by the gain weighting factor $k_i$ of unity or 1.

As stated, each of the calculations in blocks 100, 110, 120 multiplies the signal $s_i$ received from the sensors by an appropriate gain weighting factor, $k^i$. Coefficients $k_i$ represent the average value of the shading function over the i-th sensor's aperture. Coefficients $k_i$ are obtained from the following equation, $$k_i \propto \frac{\int_A \int w(x,z,t) dA}{\int_A \int dA} \qquad (9)$$

where
for the x numerator signals (block 100), $w(x, z, t) = x^n$;
for the z numerator signals (block 110), $w(x, z, t) = z^n$; and
for the denominator signals (block 120), $w(x, z, t) = 1$; and
A is the sensor area.

Following the summations in blocks 100, 110 and 120, the x-numerator signals are divided by the denominator signals in block 130 to yield the center of force in the x-direction. Similarly, the z-numerator signals are divided by the denominator signals in block 140 to yield the center of force in the z-direction. The sum of all of the signals from each of the sensors in block 120 is scaled in block 150 to yield the weight of the individual in block 160.

Figure 18:
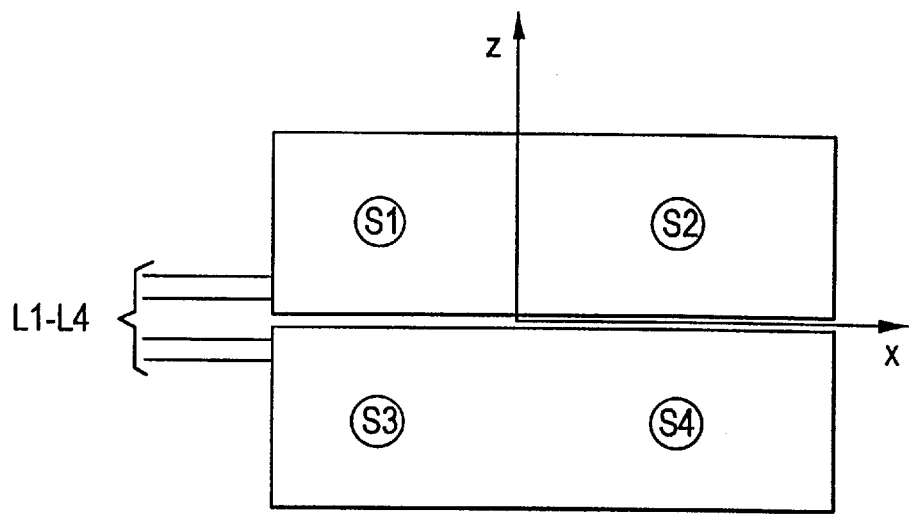
FIG. 18 is four-element sensor configured to approximate a linear shading function along the x-direction.
Figure 18A:
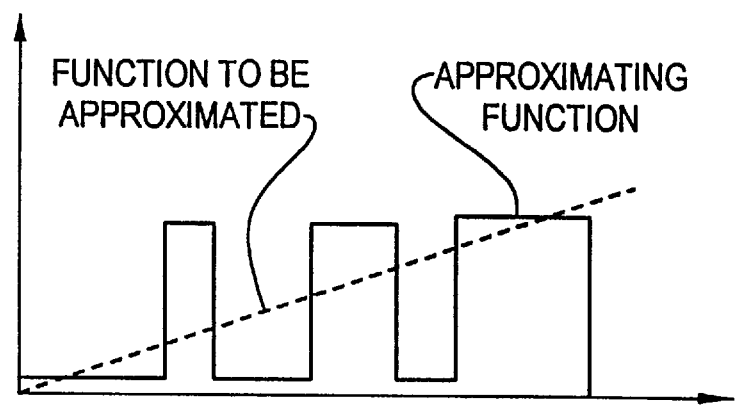
FIG. 18a depicts the method of shaping the sensors of FIG. 18 to approximate the linear function.

With reference to FIG. 18, a sensor system according to a further preferred embodiment is shown. In this embodiment, the sensor shaping itself approximates a continuous function. In other words, rather than using several sensor elements and summing them using variable gains $k_i$, each sensor S1–S4 has a fixed gain with variable spacing between the center-to-center width of the elements. This is preferably accomplished by shaping the electrode on piezopolymer film layers, which eliminates the necessity of ancillary shading electronics. For example, with reference to FIG. 18a, if the shading function to be approximated is linear, a variable-width, constant amplitude functional approximation could be employed. It will be readily appreciated by those of ordinary skill in the art that the number of "pulses" in the approximation can be far greater than the three shown. Each of sensors S1–S4 has three interconnected segments which are electrically connected. The widths of sensors S1–S4 are varied so as to approximate the linear shading required in the x and z-numerator equations, Equations (2), (3). The superposition of apertures 1 and 2 provides the requisite normalization signal.

Figure 19:
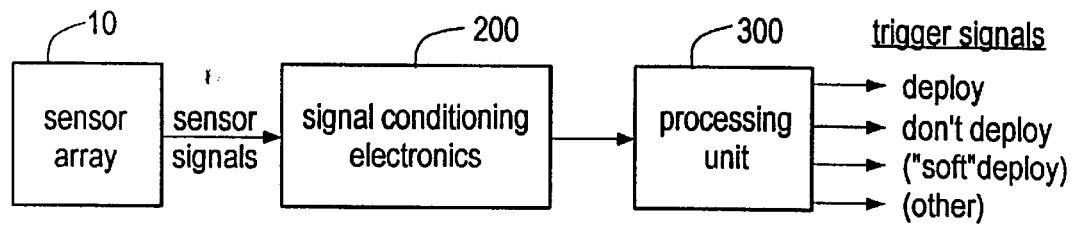
FIG. 19 is a block diagram of the electronics used to control the deployment of the airbag.

The sensing system according to the preferred embodiments is preferably coupled with suitable electronics to control the deployment of the airbag depending upon the position and weight of the individual in the seat. With reference to FIG. 19, sensor array 10 delivers the sensed signals through signal conditioning electronics 200. Conditioning electronics 200 convert the sensor outputs to voltages, scale the signals, and filter linearize and temperature compensate them as necessary. Next, the resulting signals are sent to a processing unit 300.

Figure 20:
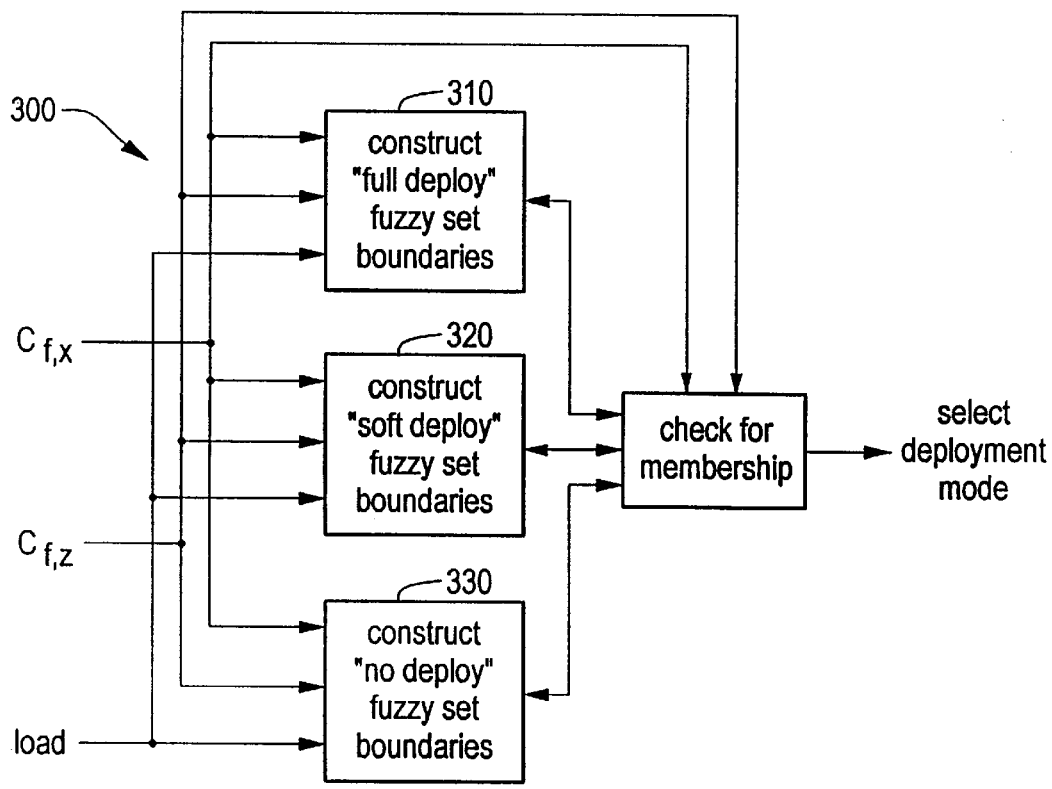
FIG. 20 is a block diagram of a portion of the processing unit where the fuzzy set logic boundaries are established from the center of weight and weight calculations.

Processing unit 300 constructs an airbag deployment scheme using fuzzy logic. Fuzzy logic is well known to those skilled in the art, and will not be explained in detail here except to note how it is implemented in the preferred embodiments. Fuzzy logic as applied to the preferred embodiments involves developing spatial membership functions or regions, where widths vary as a function of the load and its location. With reference to FIG. 20 in conjunction with FIG. 19, processing unit 300 constructs at least two, but preferably three, and possibly more fuzzy set logic boundaries based on the center of force and the weight of an individual. These boundaries preferably include a "FULL DEPLOY" boundary 310, a "SOFT DEPLOY" boundary 320 and a "NO DEPLOY" 330 boundary. In addition, other intermediate boundaries could be constructed whereby the airbag is deployed at other rates between "FULL DEPLOY" and "NO DEPLOY". Once the fuzzy set logic boundaries are established, processing unit 300 checks the center of force and weight parameters for membership in block 340. Deployment of the airbag is thus appropriately controlled based on membership in the deployment zones.

Figure 21:
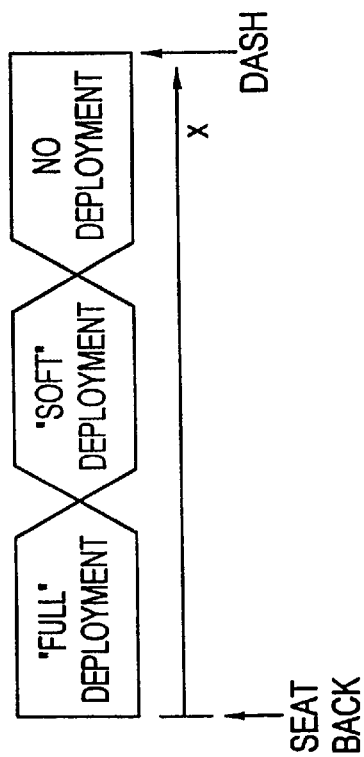
FIG. 21 graphically depicts the fuzzy set logic boundaries relative to the seat back and dashboard for one calculation of the center of force and weight of the vehicle occupant.

With further reference to FIG. 21, the fuzzy set logic boundaries according to one vehicle occupant orientation is depicted. As will be appreciated from FIG. 21, as the vehicle occupant moves closer to the seat back, the airbag is set to the "FULL DEPLOY" mode. Conversely, as the equivalent point load of the vehicle occupant moves closer to the dashboard and thus enters the "NO DEPLOY" zone, the airbag is deactivated. The location of the boundaries between "FULL DEPLOY," "SOFT DEPLOY" and "NO DEPLOY" are continuously being updated. Depending on the position and weight of the occupant, one or more of the boundaries collapses, leaving only one or two deployment modes.

Figure 22:
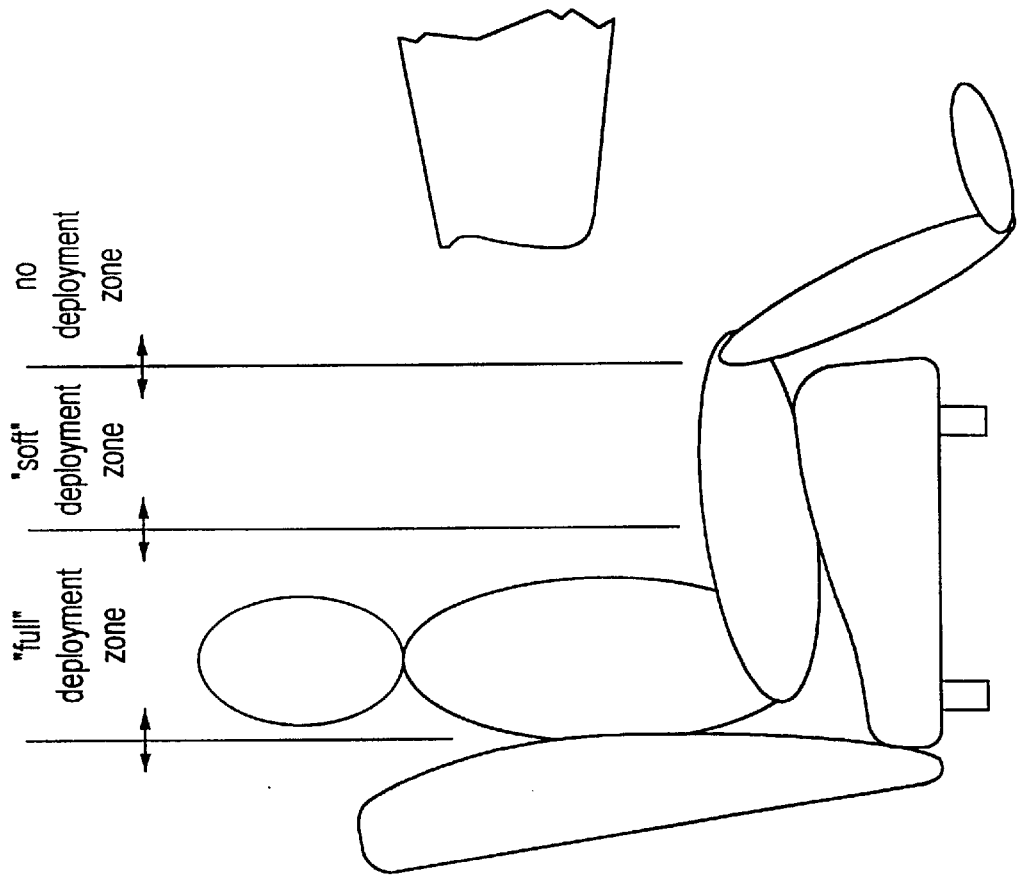
FIG. 22 is a schematic diagram of the passenger compartment showing a vehicle occupant, such as an adult, positioned in the full deployment zone.
Figure 24:
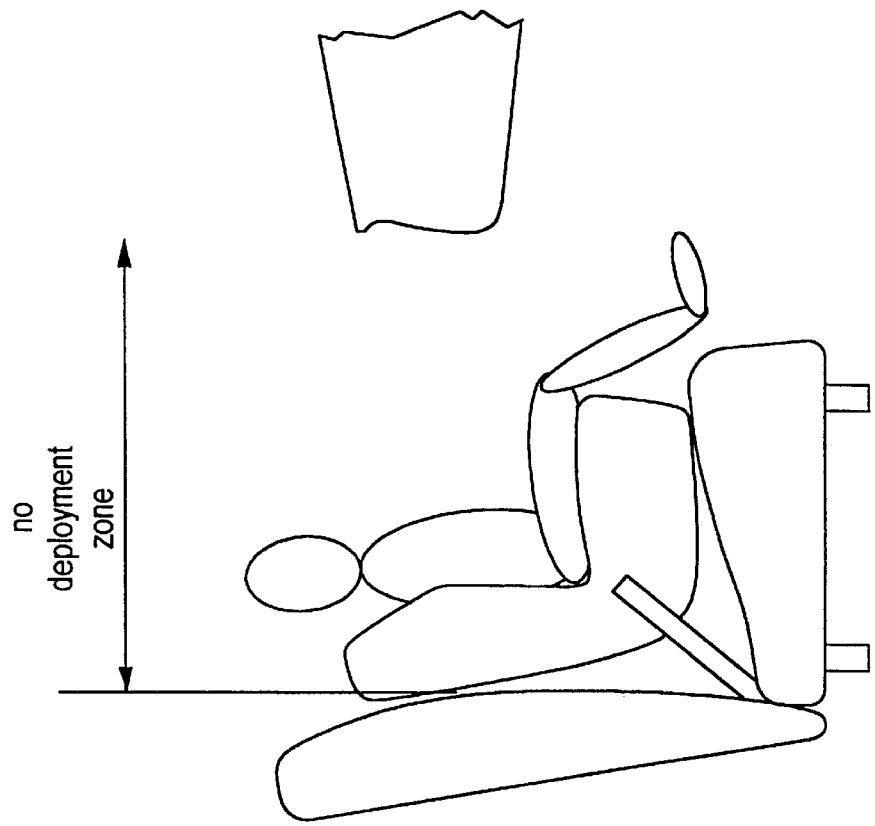
FIG. 24 is a schematic diagram of the passenger compartment showing a vehicle occupant, in this case a small child or infant in a car seat, positioned in the no deployment zone of the airbag.
Figure 23:
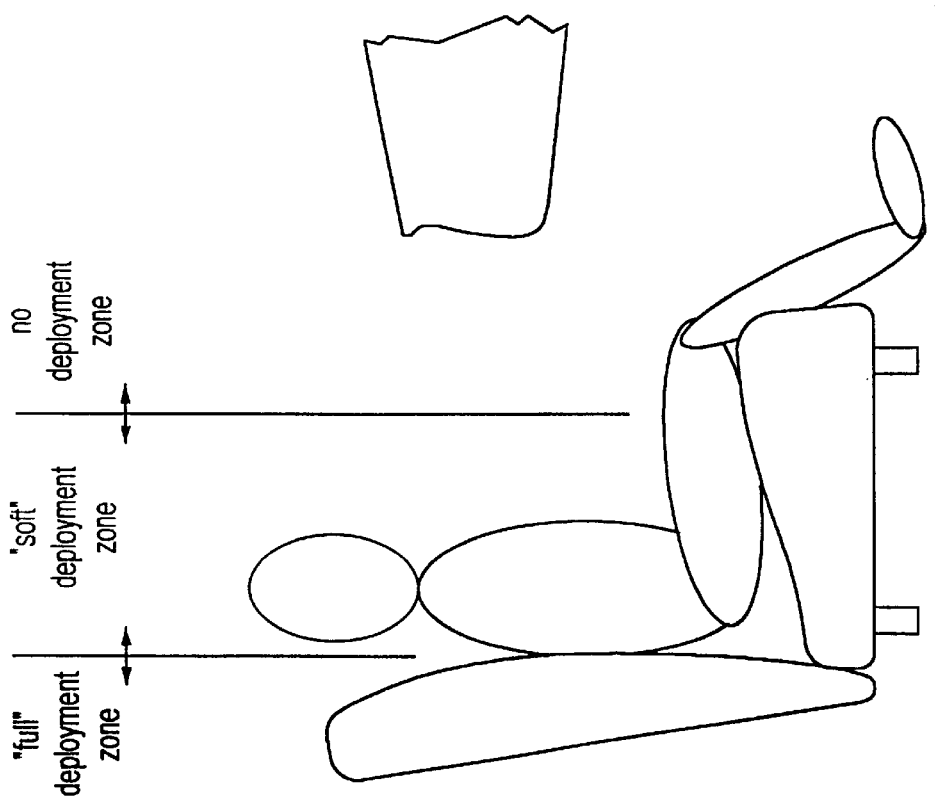
FIG. 23 is a schematic diagram of the passenger compartment showing a vehicle occupant, such as a small adult or child, positioned in the soft deployment zone.

With reference to FIGS. 22–24, fuzzy set logic boundaries for vehicle occupants of different sizes are illustrated. In FIG. 22, an adult is depicted. The equivalent point load and weight cause the fuzzy set logic boundaries to be established such as to place the passenger or driver in the "FULL DEPLOY" zone. However, if the equivalent point load of the passenger or driver moved forward in the direction of the airbag, the passenger or driver could enter the "SOFT DEPLOY" or "NO DEPLOY" zones.

In the case of FIG. 23, the vehicle occupant is a child or small adult. In this situation, the equivalent point load and weight of the vehicle occupant are such that the fuzzy set logic boundaries are adjusted so that the passenger or driver is situated in the "SOFT DEPLOY" zone. If the equivalent point load of the passenger or driver moved forward in the direction of the airbag, the passenger could enter the "NO DEPLOY" zone.

Finally, a child in a car seat is depicted in FIG. 24. Regardless of the location of the equivalent point load of the child (and the weight of the car seat), the weight of the child and car seat cause the "FULL DEPLOY" and "SOFT DEPLOY" fuzzy set logic boundaries to collapse. Consequently, the child is positioned in the "NO DEPLOY" zone, and the airbag is deactivated.

Figure 25:
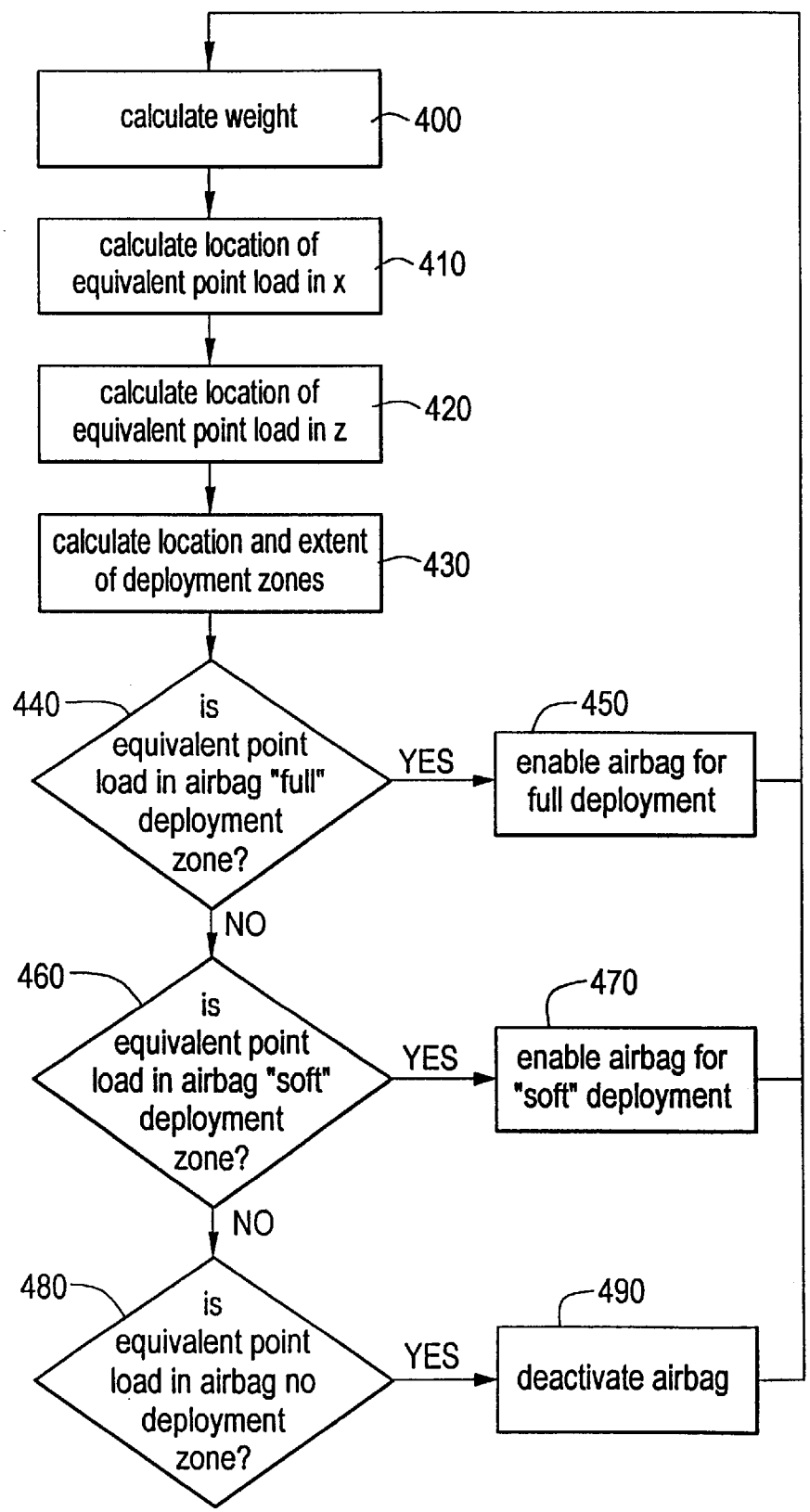
FIG. 25 is a flow diagram of the steps used to construct the fuzzy set logic boundaries, and based upon membership in the fuzzy set boundaries, whether and how the airbag will be deployed in the event of a vehicle airbag incident.

FIG. 25 is a schematic flow diagram of the computer program for controlling the deployment of the airbag based on the location of the equivalent point load and weight of the passenger as calculated using the shaded sensory apertures and centroiding analysis described above. First, in block 400 of the program, the weight of the passenger is calculated from the signals received from the sensors. Next, in block 410, the location of the passenger's equivalent point load along the x-direction (front-to-back) of the passenger seat is calculated. Likewise, in block 420, the location of the equivalent point load in the z-direction (side-to-side) along the passenger seat is calculated. Based on the location of the equivalent point load and the weight of the passenger, the location and extent of the deployment zones, i.e. the fuzzy set logic boundaries are established in block 430. Next, in block 440, a determination is made as to whether the equivalent point load of the airbag is in the "FULL DEPLOY" zone. If so, the airbag is fully enabled in block 450. If not, the program moves to block 460 where it is determined whether the equivalent point load is in the "SOFT DEPLOY" zone. If so, the airbag is partially enabled in the "SOFT DEPLOY" mode. If not, the program proceeds to block 480 where it is determined whether the equivalent point load is in the "NO DEPLOY" zone. The airbag is then deactivated in block 490 and the program is repeated. Accordingly, the airbag deployment mode is continuously updated according to the preferred embodiments.

The vehicle occupant has been described in several instances as the passenger. It is to be understood, however, that the driver is likewise to be considered a passenger or vehicle occupant and the invention as defined by the appended claims are to be construed as including sensor systems incorporated into either the driver's or the passenger's seats. Further, it will be appreciated that a pet, package or unoccupied child car safety seat will generate signals just as if a person was positioned in the seat, and control the deployment of the airbag accordingly.

The present invention has been described primarily in terms of a control system used to control the deployment an airbag in an automobile. However, the invention is not limited to such applications. Rather, the invention has many other practical applications too numerous to name here. Instead, it will be understood that the invention has particular practical utility in applications where information about the center of weight and position of an equivalent point load could be used to analyze static or dynamic environments.

One such application currently being explored by the inventors is applying the center of weight and position sensor to the insole of a shoe to analyze gait. In this application, the sensing system of the preferred embodiment is preferably applied to beneath a removable insole. The sensors are positioned beneath the insole such that the sensing aperture is defined by the periphery of the bottom of the shoe. The subject is then positioned on a treadmill, and begins walking or running.

The nearly instantaneous feedback provided by the weight and position sensor allows a dynamic center of weight and position signature to be generated as the subject moves on the treadmill. This information could be useful to diagnose a host of problems, such as vertigo, strains, sprains, as well as provide an indicator of an individual's recovery from an that manifests itself while ambulatory. Many other practical applications are intended to be encompassed by the sensing system of the preferred embodiments, as will be appreciated by one of ordinary skill in the art after having considered the foregoing disclosure. Thus, while the present invention has been described in terms of the preferred embodiments, the invention is not limited thereto. Various modifications may easily be made by those skilled in the art without departing from the scope of the invention as defined by the appended claims.

We claim:

1. A sensing system for determining the magnitude and localized equivalent point load position in two-dimensional space of a distributed load comprising:

(a) a plurality of sensing elements each having a predetermined area and located in a two-dimensional area subject to distributed loads, each sensing element further producing an output signal proportional to an integral of the applied stress over the area of the sensing element; and (b) means for approximating the center of force or position of the equivalent point load in said two-dimensional area by weighting and summing the output signals from said sensing elements that approximate the output of two idealized sensors extending respectively to the X and Z boundaries of said two-dimensional space and each of said two idealized sensors producing an output signal that is weighted along the X and Z axes respectively to get two numerators, and dividing each of said numerators by a denominator which is obtained by summing the output signals from said sensing elements that approximate the output of one idealized sensor extending to the X and Z boundaries of said two-dimensional space and which produces an output signal that is uniformly weighted over both the X and Z directions.

2. The sensing system of claim 1, said numerator signals weighted to obtain spatial moments above n>1.

3. The sensing system of claim 1, said numerator signals linearly weighted along the X and Z axes.

4. The sensing system of claim 1, said numerator signals weighted to at least the second power along the X and Z axes.

5. The sensing system of claim 1, said plurality of sensing elements comprising three sensors located in said two-dimensional area.

6. The sensing system of claim 1, further comprising means for continuously determining the position and equivalent point load of the distributed load.

7. The sensing system of claim 1, further comprising a plurality of sensors disposed in a seat of an automobile.

8. The sensing system of claim 7, wherein the distributed load is generated by a vehicle occupant seated in said seat, said plurality of sensors positioned in an aperture outlining the boundaries in which the distributed load of the vehicle occupant is located.

9. The sensing system of claim 7, said means for approximating further comprising:

(a) means for determining the position of an equivalent point load along at least one axis of a distributed load created by a vehicle occupant sitting in the seat, said position of said equivalent point load approximating the position of the vehicle occupant; and (b) means for controlling the deployment of an airbag upon occurrence of an airbag incident depending upon the weight and the position along said at least one axis of said equivalent point load.

10. The sensing system of claim 1, said plurality of sensors positioned in an aperture in which the distributed point load is applied, said aperture having a portion of which is not covered with sensors.

11. The sensing system of claim 10, at least two of said plurality of sensing elements overlapping with one another.

12. A sensing system according to claim 1, wherein said sensing elements are variably shaped and spaced such that the output signals from two subcombinations of the sensing elements are added together with unity weighting by the approximating means to obtain said numerators.

13. A sensing system according to claim 12, wherein each sensing element includes a film transducer having a patterned electrode on one surface thereof such that the output signal produced by each sensing element is a function of the area and shape of the patterned electrode.

14. A sensing system according to claim 1, wherein said sensing elements are of uniform shape and spacing such that the output signals from two subcombinations of the sensing elements are added together with variable weighting by the approximating means to obtain said numerators, and the output signals from a third subcombination of the sensing elements are added together with uniform weighting by the approximating means to obtain said denominator.

15. A sensing system for controlling the deployment of an airbag in an automobile comprising:
(a) at least three sensors disposed in a seat of the automobile, each sensor producing an output signal varying over a range that is a function of the magnitude of the stress applied over the area of the sensor in response to a vehicle occupant sitting in the seat;
(b) means for determining from said sensor output signals the weight of the vehicle occupant and the position of an equivalent point load along at least one axis of a distributed load created by the vehicle occupant sitting in the seat, said position of said equivalent point load approximating the position of the vehicle occupant; and
(c) means for controlling the deployment of the airbag upon occurrence of an airbag incident depending upon the determined weight and position.

16. The sensor system according to claim 15 further comprising means for determining the position of the equivalent point load of the vehicle occupant along two axes.

17. The sensor system according to claim 15 further comprising means for continuously determining the position of the equivalent point load of the vehicle occupant.

18. The sensor system according to claim 17 further comprising means for determining the position of the equivalent point load of the vehicle occupant in two-dimensional space.

19. The sensor system according to claim 15 further comprising a plurality of sensors disposed in the seat of the vehicle.

20. The sensor system according to claim 19, said plurality of sensors positioned in an aperture outlining the boundaries in which the distributed load of the vehicle occupant is located.

21. The sensor system according to claim 20, at least two of said plurality of sensors overlapping one another.

22. The sensor system according to claim 20, said aperture comprising a rectangular aperture and said plurality of sensors comprising four sensors positioned in respective quadrants of said aperture.

23. The sensor system according to claim 22, said aperture having a portion of which is not covered with sensors.

24. A sensor system according to claim 15, wherein said sensors are variably shaped and spaced such that the output signals from two subcombinations of the sensors are added together with unity weighting by the determining means in determining the weight of the vehicle occupant and the position of the equivalent point load of the vehicle occupant.

25. A sensing system according to claim 24, wherein each sensor includes a film transducer having a patterned electrode on one surface thereof such that the output signal produced by each sensor is a function of the area and shape of the patterned electrode.

26. A sensor system according to claim 15, wherein said sensors are of uniform shape and spacing such that the output signals from two subcombinations of the sensors are added together with variable weighting by the determining means in determining the weight of the vehicle occupant and the position of the equivalent point load of the vehicle occupant.

27. A sensor system according to claim 15, wherein the analog output signal from each sensor is proportional to the integral of the stress applied over the area of the sensor.

28. A method for controlling the deploying of an airbag in a vehicle comprising the steps of:
(a) providing at least three sensors disposed in a passenger seat of the vehicle, each sensor producing an output signal varying over a range that is a function of the magnitude of the stress applied over the area of the sensor in response to a vehicle occupant sitting in the seat;
(b) determining from said sensor output signals the weight of the vehicle occupant and the position of an equivalent point load of the vehicle occupant, said equivalent point load describing the position of the vehicle occupant relative to the airbag; and
(c) controlling the deployment of the airbag upon occurrence of an airbag incident depending on the determined weight and position.

29. The method according to claim 28 further comprising the step of deactivating the airbag when the position of said equivalent point load of the center of the vehicle occupant is located in the firing zone of the airbag.

30. The method according to claim 28 further comprising the step of deactivating the airbag when the weight of the vehicle occupant is less than a predetermined value.

31. The method according to claim 28 further comprising the step of continuously determining the position of the equivalent point load of the vehicle occupant.

32. The method according to claim 28 further comprising the step of determining the position of the equivalent point load of the vehicle occupant in two-dimensional space.

33. A method according to claim 28, wherein said sensors are variably shaped and spaced such that the output signals from two subcombinations of the sensing elements are added together with unity weighting in determining the weight of the vehicle occupant and the position of the equivalent point load of the vehicle occupant.

34. A method according to claim 33, wherein each sensor includes a film transducer having a patterned electrode on one surface thereof such that the output signal produced by each sensor is a function of the area and shape of the patterned electrode.

35. A method according to claim 28, wherein said sensors are of uniform shape and spacing such that the output signals from two subcombinations of the sensors are added together with variable weighting in determining the weight of the vehicle occupant and the position of the equivalent point load of the vehicle occupant.

36. A method according to claim 28, wherein the analog output signal from each sensor is proportional to the integral of the stress applied over the area of the sensor.

37. A method for determining the magnitude and localized equivalent point load position in two-dimensional space of a dynamic or static load comprising:
(a) providing a plurality of sensing elements each having a predetermined area and each located in a two-dimensional area subject to distributed loads;
(b) sensing an output signal of the sensing elements, said output signal proportional to an integral of the applied stress over the area of the sensing element;
(c) approximating the center of force in said two-dimensional area by weighting and summing the output signals from said sensing elements that approximate the output of two idealized sensors extending respectively to the X and Z boundaries of said two-dimensional space, each of said two idealized sensors producing an output signal that is weighted along the X and Z axes respectively to get two numerators; and (d) dividing each of said numerators by a denominator which is obtained by summing the output signals from said sensing elements that approximate the output of one idealized sensor extending to the X and Z boundaries of said two-dimensional space and which produces an output signal that is uniformly weighted over both the X and Z direction.

38. A method of controlling the deployment force of an airbag in an automobile, comprising the steps of:

calculating the weight of an occupant of a seat in the automobile;

calculating the location of an equivalent point load of the occupant;

calculating the location and extent of at least two deployment zones of the airbag based on the weight and equivalent point load of the occupant, a first deployment zone being associated with a first predetermined deployment force of the airbag and a second deployment zone being associated with a second predetermined deployment force of the airbag different from the first predetermined deployment force;

determining whether the equivalent point load is located in the first deployment zone, and if so enabling the air bag for deployment at the first deployment force; and determining whether the equivalent point load is located in the second deployment zone, and if so enabling the air bag for deployment at the second deployment force.

* * * * *